US010607376B2

(12) United States Patent
Lv et al.

(10) Patent No.: US 10,607,376 B2
(45) Date of Patent: Mar. 31, 2020

(54) METHOD AND APPARATUS FOR ADJUSTING COLOR TEMPERATURE BASED UPON FUZZY CONTROL (71) Applicants: BOE Technology Group Co., Ltd., Beijing (CN); Hefei BOE Display Lighting Co., Ltd., Hefei, Anhui (CN)

(72) Inventors: Tu Lv, Beijing (CN); Peina Wang, Beijing (CN)

(73) Assignees: BOE Technology Group Co., Ltd., Beijing (CN); Hefei BOE Display Lighting Co., Ltd., Hefei (CN)

(*) Notice: Subject to any disclaimer, the term of this patent is extended or adjusted under 35 U.S.C. 154(b) by 0 days.

(21) Appl. No.: 16/030,067

(22) Filed: Jul. 9, 2018

(65) Prior Publication Data
US 2019/0066340 A1  Feb. 28, 2019

(30) Foreign Application Priority Data

Aug. 31, 2017   (CN) .......................... 2017 1 0775415

(51) Int. Cl.
*G06T 11/00* (2006.01)
*G09G 5/00* (2006.01)
(Continued)

(52) U.S. Cl.
CPC ............... *G06T 11/001* (2013.01); *G09G 5/00* (2013.01); *H04N 9/73* (2013.01); *H04N 17/00* (2013.01)

(58) Field of Classification Search
None
See application file for complete search history.

(56) References Cited

U.S. PATENT DOCUMENTS

2010/0214087 A1* 8/2010 Nakagoshi ............... A61B 5/18
340/436
2017/0303365 A1* 10/2017 Chen .................. H05B 33/0872

FOREIGN PATENT DOCUMENTS

CN   103472918 A      12/2013
CN   104503683 A  *   4/2015
CN   104503683 A      4/2015

OTHER PUBLICATIONS

Balasubramanian et al. "A novel Fuzzy Logic Based Controller to Adjust the Brightness of the Television Screen with Respect to Surrounding Light", International Journal of Electronics and Communication Engineer vol. 2 No. 3, 2008, p. 532-535 (Year: 2008).*

(Continued)

*Primary Examiner* — Yingchun He
(74) *Attorney, Agent, or Firm* — Arent Fox LLP; Michael Fainberg (57) ABSTRACT The disclosure discloses a method and apparatus for adjusting color temperature based upon fuzzy control. The method for adjusting color temperature based upon fuzzy control includes: determining an initial color temperature value of a screen of an terminal device according to an illumination intensity of ambient light when the screen is lightened; obtaining a percentage of eyelid closure over the pupil, over time, PERCLOS of a user, and the illumination intensity of ambient light at a preset periodicity; and determining a target color temperature value corresponding to the current PERCLOS of the user, and the current illumination intensity of ambient light according to a preset fuzzy rule, and adjusting the screen to the target color temperature value, wherein taking the PERCLOS, and the illumination intensity of ambient light as input signals, and the color temperature as an output signal according to the preset fuzzy rule.

7 Claims, 4 Drawing Sheets (51) Int. Cl.
*H04N 9/73* (2006.01)
*H04N 17/00* (2006.01)
*G05B 13/02* (2006.01)

(56) References Cited

OTHER PUBLICATIONS

Broekhoven et al. "Fast and accurate center of gravity defuzzification of fuzzy system outputs defined on trapezoidal fuzzy partitions", Fuzzy Sets and Systems 157(2006) 904-918 (Year: 2006).*
Seegehalli "Digital Eye Strain Reduction Techniques: A Review", IJCSE vol. 8 No. 3 Mar. 2016 (Year: 2016).*

* cited by examiner

METHOD AND APPARATUS FOR ADJUSTING COLOR TEMPERATURE BASED UPON FUZZY CONTROL

CROSS-REFERENCE TO RELATED APPLICATION

This application claims priority of Chinese Patent Application No. 201710775415.X, filed on Aug. 31, 2017, which is hereby incorporated by reference in its entirety.

FIELD

The present disclosure relates to the field of intelligent control, and optionally to a method and apparatus for adjusting color temperature based upon fuzzy control.

BACKGROUND

Mobile phones, tablet computers, and other terminal devices are playing a more and more important role in our life, and every user of a mobile phone also focuses his or her eyes on the screen of the mobile phone for a very long period of time every day. However the user of the mobile phone holds his or her mobile phone at a shorter distance from his or her eyes while reading the mobile phone than reading a paper material, and reading at such a short distance may aggravate a burden on the eyes of the user; there is such a small font on the screen of the mobile phone that it is also inconvenient for the user to read with his or her eyes; and the eyes of the user playing game, browse Weibo™ reading a novel, etc., are also being weaken without being noticed.

Due to the various reasons above, apparently the screen of the mobile phone has become a major killer and even the first killer of our vision nowadays, so that the user of the mobile phone tends to suffer from a blurry sight, red and swollen eyes, rapid degradation of vision, and other serious aftermaths. Moreover serious hurting by blue light may result from a long use of single color temperature.

SUMMARY

An embodiment of the disclosure provides a method for adjusting color temperature based upon fuzzy control, the method including:

determining an initial color temperature value of a screen of an terminal device according to an illumination intensity of ambient light in response to that the screen is lightened;

obtaining a percentage of eyelid closure over the pupil, over time, (PERCLOS) of a user, and the illumination intensity of ambient light at a preset periodicity; and determining a target color temperature value corresponding to the current eye closeness ratio of the user, and the current illumination intensity of ambient light according to a preset fuzzy rule, and adjusting the screen to the target color temperature value.

In some embodiments of the disclosure, the preset fuzzy rule includes:

categorizing the eye closeness ratio into at least one level, and creating a subjection function of the eye closeness ratio; categorizing the illumination intensity of ambient light into at least one level, and creating a subjection function of the illumination intensity of ambient light; and categorizing the color temperature value into at least one level, and creating a subjection function of the color temperature value; and taking the at least one level corresponding to the eye closeness ratio, and the at least one level corresponding to the illumination intensity of ambient light as input signals, taking the at least one level of the color temperature value as an output signal.

In some embodiments of the disclosure, categorizing the PERCLOS into three levels which are Level-headed (S), Fatigued (M), and Exhausted (L) respectively; categorizing the illumination intensity of ambient light into four levels which are Dark light rays (NM), Normal light rays (NS), Bright light rays (PS), and Very bright light rays (PB) respectively; and categorizing the color temperature value into six levels which are Warm and reddish light (RB), Normal and warm light (RM), Normal and natural white light (RS), Natural, white and bluish light (BS), Normal and cold white (BM), and Cold and bluish light (BL) respectively.

In some embodiments of the disclosure, determining the target color temperature value corresponding to the PERCLOS of the user, and the illumination intensity of ambient light according to the preset fuzzy rule, and adjusting the screen to the target color temperature value includes:

fuzzifying the values of the PERCLOS, and the illumination intensity of ambient light, determining the subjection of the level corresponding to the fuzzified PERCLOS according to the subjection function of the PERCLOS, and determining the subjection of the level corresponding to the fuzzified illumination intensity of ambient light according to the subjection function of the illuminationintensity of ambient light;

determining the subjection of the level of the color temperature value corresponding to the subjection of the level corresponding to the current PERCLOS, and the subjection of the level corresponding to the current illumination intensity of ambient light under the fuzzy rule; and de-fuzzifying the subjection of the level of the color temperature value, and determining the subjection of the level of the color temperature value.

In some embodiments of the disclosure, de-fuzzifying the subjection of the level of the color temperature value includes:

de-fuzzifying the subjection of the level of the color temperature value based upon a center-of-gravity method.

In some embodiments of the disclosure, the PERCLOS X of the user in a preset length of time is obtained in the equation of $$X = \sum_{i=1}^{n} \frac{t}{T}, 1 \le i \le n;$$

wherein T is the length of time of the periodicity; t is each instance of time when the eyes are closed, and n is the number of times that the eyes are closed in the length of time of the periodicity.

In some embodiments of the disclosure, the adjusting the screen to the target color temperature value includes:

adjusting a proportion of blue light among red, blue, and green light of the screen until the screen reaches the target color temperature value.

Correspondingly an embodiment of the disclosure provides an apparatus for adjusting color temperature based upon fuzzy control, the apparatus including: a processor and a memory configured to store computer-readable programs; the processor is configured to read the computer-readable programs to:

determine an initial color temperature value of a screen of a terminal device according to an illumination intensity of ambient light in response to that the screen is lightened;

obtain a percentage of eyelid closure over the pupil, over time, (PERCLOS) of a user, and the illumination intensity of ambient light at a preset periodicity; and determine a target color temperature value corresponding to the PERCLOS of the user, and the illumination intensity of ambient light using a fuzzy controller, and adjust the screen to the target color temperature value.

In some embodiments of the disclosure, the fuzzy controller is configured to enforce a preset fuzzy rule; the preset fuzzy rule is created by:

categorizing the PERCLOS into at least one level, and creating a subjection function of the PERCLOS; categorizing the illumination intensity of ambient light into at least one level, and creating a subjection function of the illumination intensity of ambient light; and categorizing the color temperature value into at least one level, and creating a subjection function of the color temperature value; and taking the at least one level corresponding to the PERCLOS, and the at least one level corresponding to the illumination intensity of ambient light as input signals, taking the at least one level of the color temperature value as an output signal.

In some embodiments of the disclosure, the preset fuzzy rule is further created by:

categorize the PERCLOS into three levels which are Level-headed (S), Fatigued (M), and Exhausted (L) respectively; categorize the illumination intensity of ambient light into four levels which are Dark light rays (NM), Normal light rays (NS), Bright light rays (PS), and Very bright light rays (PB) respectively; and categorize the color temperature value into six levels which are Warm and reddish light (RB), Normal and warm light (RM), Normal and natural white light (RS), Natural, white and bluish light (BS), Normal and cold white (BM), and Cold and bluish light (BL) respectively.

In some embodiments of the disclosure, the processor is configured to read the computer-readable programs to determine the target color temperature value corresponding to the PERCLOS of the user, and the illumination intensity of ambient light using the fuzzy controller, and adjust the screen to the target color temperature value, by:

fuzzifying the values of the PERCLOS, and the illumination intensity of ambient light, determining the subjection of the level corresponding to fuzzified PERCLOS according to the subjection function of the PERCLOS, and determining the subjection of the level corresponding to fuzzified illumination intensity of ambient light according to the subjection function of the illumination intensity of ambient light;

determining the subjection of the level of the color temperature value corresponding to the subjection of the level corresponding to the PERCLOS, and the subjection of the level corresponding to the illumination intensity of ambient light under the preset fuzzy rule; and de-fuzzifying the subjection of the level of the color temperature value, and determining the subjection of the level of the color temperature value.

In some embodiments of the disclosure, the processor is configured to read the computer-readable programs to obtain the PERCLOS X of the user in a preset length of time in the equation of:

$$X = \sum_{i=1}^{n} \frac{t}{T} \quad 1 \le i \le n;$$

wherein T is the length of time of the periodicity, t is each instance of time when the eyes are closed, and n is the number of times that the eyes are closed in the length of time of the periodicity.

In some embodiments of the disclosure, the processor is configured to read the computer-readable programs to adjust the screen to the target color temperature value by:

adjusting a proportion of blue light among red, blue, and green light of the screen until the screen reaches the target color temperature value.

DETAILED DESCRIPTION OF THE EMBODIMENTS

It shall be noted that specific details will be set forth in the following description to facilitate full understanding of the disclosure, but the disclosure can be embodied in a variety of other embodiments than those described here, and those skilled in the art can generalize them similarly without departing from the sprit of the disclosure, so the disclosure will not be limited to the particular embodiments as disclosed below. Some denomination as used in the description and the claims refers to a specific component. Those skilled in the art shall appreciate that the same component may be denominated by different hardware manufacturers using different names. One component will be distinguished from another component in the description and the claims by their functional difference instead of their different names. The opening term "include" or "comprise" as referred to throughout the description and the claims shall be interpreted as "include but will not be limited to". Optional embodiments of the disclosure will be described below in the description, but they are merely intended to illustrate a general principle of the disclosure instead of limiting the scope of the disclosure thereto. The scope of the disclosure as claimed shall be as defined in the appended claims.

In the related art, in order to avoid our eyes from being hurt by the screen, it is proposed to protect our eyes by controlling our blinking frequency, to protect our eyes by adjusting the color temperature of the screen according to the length of time for which the screen has been lightened, and the number of times that we have blinked, etc.

However in the solutions above, the screen is not adjusted in real-time to appropriate color temperature according to our ambient, and the fatigue extent of our eyes, so the eyes may still got hurt; and it may be troublesome to adjust the color temperature.

The embodiments of the disclosure provide a method and apparatus for adjusting color temperature based upon fuzzy control so as to adjust color temperature of a screen in real-time in a fuzzy control algorithm simply and precisely to thereby alleviate our eyes from being hurt by an electronic product.

Figure 1:
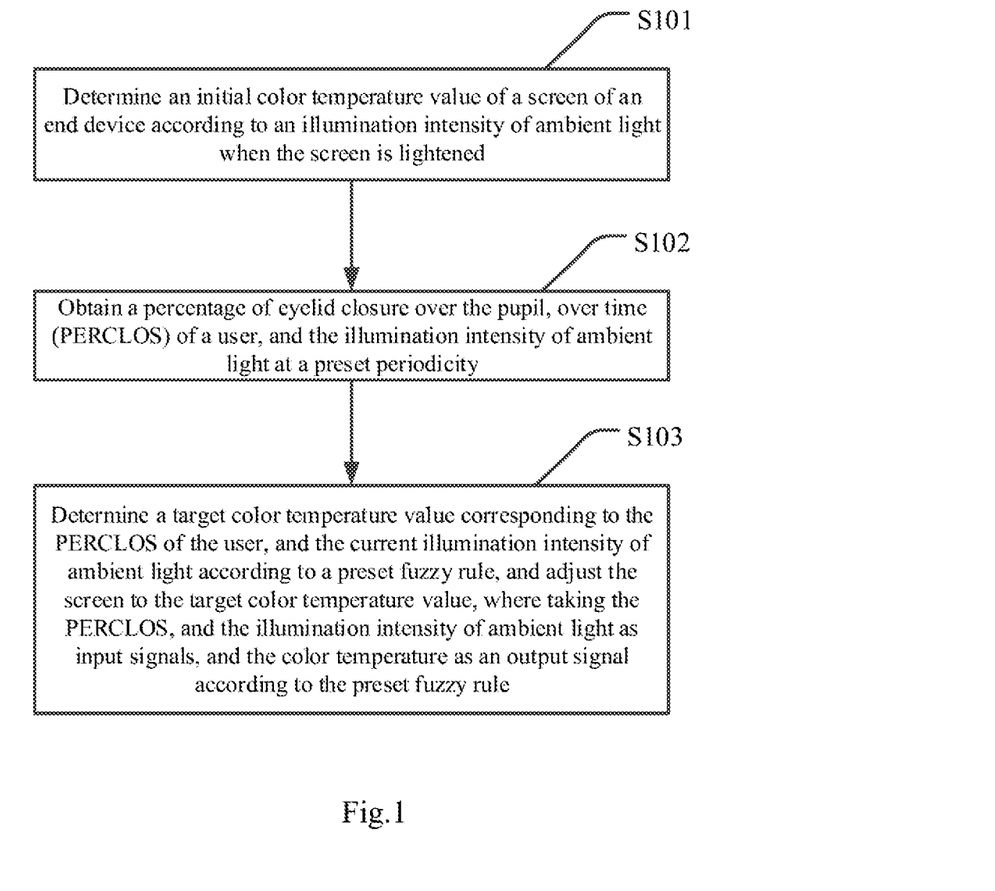
FIG. 1 is a schematic flow chart of a method for adjusting color temperature based upon fuzzy control according to an embodiment of the disclosure.

Referring to FIG. 1, a method for adjusting color temperature based upon fuzzy control according to an embodiment of the disclosure includes:

S101 is to determine an initial color temperature value of a screen of a terminal device according to an illumination intensity of ambient light when the screen is lightened.

The terminal device in the embodiment of the disclosure can be a mobile phone, a computer, an electronic device with a display function, etc. The illumination intensity of ambient light can be acquired by a sensor. The screen of the terminal device in the embodiment of the disclosure being lightened refers to such a level that the screen is just powered on, or the sleeping screen is just awoken. When the screen is lightened, the screen is adjusted to the initial color temperature value according to the illumination intensity of ambient light, so that the screen which is just lightened is more appropriate for being watched in the ambient to thereby improve the comfort of a user.

S102 is to obtain a percentage of eyelid closure over the pupil, over time (PERCLOS) of a user, and the illumination intensity of ambient light at a preset periodicity.

The preset periodicity in the embodiment of the disclosure can be set to 10 seconds or shorter, although the embodiment of the disclosure will not be limited thereto. In the embodiment of the disclosure, the PERCLOS of a user, and the illumination intensity of ambient light are obtained at the preset periodicity so that the color temperature of the screen is adjusted constantly at the length of time of the periodicity. The preset periodicity in the embodiment of the disclosure can be set very short, e.g., one second, so that the color temperature of the screen can be adjusted constantly without being noticed by the user, thus making the eyes of the user more comfort.

S103 is to determine a target color temperature value corresponding to the current PERCLOS of the user, and the current illumination intensity of ambient light according to a preset fuzzy rule, and to adjust the screen to the target color temperature value, where the preset fuzzy rule takes the eye closeness ratio, and the illumination intensity of ambient light as input signals, and the color temperature as an output signal.

In the method for adjusting color temperature based upon fuzzy control according to the embodiment of the disclosure, firstly the initial color temperature value of the screen of the terminal device is determined according to the illumination intensity of ambient light when the screen is lightened; then the PERCLOS of the user, and the illumination intensity of ambient light are obtained at the preset periodicity; and the target color temperature value corresponding to the current PERCLOS, and the current illumination intensity of ambient light is determined according to the preset fuzzy rule, and the screen is adjusted to the target color temperature value. Accordingly in the method for adjusting color temperature based upon fuzzy control according to the embodiment of the disclosure, the initial color temperature value is determined according to the illumination intensity of ambient light when the screen is lightened, and then the screen is adjusted in real time to the corresponding target color temperature value according to the PERCLOS, and the illumination intensity of ambient light, both of which are obtained periodically. Apparently in the embodiment of the disclosure, the color temperature of the screen is adjusted in real time according to the illumination intensity of ambient light, and the PERCLOS of the user to thereby alleviate the eyes from being fatigued, so as to further alleviate the eyes from being hurt. Furthermore in the embodiment of the disclosure, the color temperature is controlled and adjusted through fuzzy control to thereby determine the target color temperature value more simply and precisely.

In the method according to some embodiments of the disclosure, the preset fuzzy rule is created as follows.

The PERCLOS is categorized into three levels which are Level-headed (S), Fatigued (M), and Exhausted (L) respectively, and a subjection function of the PERCLOS is created; the illumination intensity of ambient light is categorized into four levels which are Dark light rays (NM), Normal light rays (NS), Bright light rays (PS), and Very bright light rays (PB) respectively, and a subjection function of the illumination intensity of ambient light is created; and the color temperature value is categorized into six levels which are Warm and reddish light (RB), Normal and warm light (RM), Normal and natural white light (RS), Natural, white and bluish light (BS), Normal and cold white (BM), and Cold and bluish light (BL) respectively, and a subjection function of the color temperature value is created.

The subjection function corresponding to the PERCLOS, and the subjection function corresponding to the illumination intensity of ambient light are taken as input signals, and the subjection function of the color temperature value is taken as an output signal.

In the method according to some embodiments of the disclosure, the PERCLOS X of the user in a preset length of time is obtained as defined in Equation (1) of:

$$X = \sum_{i=1}^{n} \frac{t}{T} \quad 1 \le i \le n; \tag{1}$$

where T is the length of time of the periodicity, t is each instance of time when the eyes are closed, and n is the number of times that the eyes are closed in the length of time of the periodicity.

For example, the PERCLOS is determined as defined in Equation (1) above, and if T is 10 seconds, and the eyes are closed five times, where the eyes have been closed respectively for 1, 0.5, 1, 0.8, and 0.9 second, so the PERCLOS is calculated in Equation (1) as 1/10+0.5/10+1/10+0.8/10+0.9/10=0.42. In order to further determine a correspondence relationship between a percentage of eyelid closure over the pupil, over time, and a fatigue extent, reference can be made to Table 1.

TABLE 1

|  | PERCLOS | | |
| --- | --- | --- | --- |
|  | <0.075 | 0.075-0.15 | >0.15 |
| Level | Level-headed | Fatigued | Exhausted |

In some embodiments of the present disclosure, the fatigue extent of the eyes is categorized into three levels which are Level-headed (S), Fatigued (M), and Exhausted (L) respectively, and referring to FIG. 1, for example, the range of the PERCLOS<0.075 is categorized into Level-headed (S); the range of the PERCLOS 0.075-0.155 is categorized into Fatigued (M); and the range of the PER-CLOS>0.15 is categorized into Exhausted (L). For example, if the fatigue extent of the eyes is 0.2, then the current level of the user will be the range of Exhausted as per Table 1.

In some embodiments of the present disclosure, in order to further adjust the color temperature value of a display panel in real time according to the PERCLOS, and the illumination intensity of ambient light in the fuzzy control algorithm, the PERCLOS, and the illumination intensity of ambient light are taken as input signals of a fuzzy controller, and the color temperature is taken as an output signal of the fuzzy controller in the embodiment of the disclosure. In some embodiments of the present disclosure, the fuzzy controller involving the PERCLOS, the illumination intensity of ambient light, and the color temperature value is created in advance, firstly the subjection function of the PERCLOS, the subjection function of the illumination intensity of ambient light, and the subjection function of the color temperature value are created in advance, then the preset fuzzy rule involving the three levels of the PERCLOS, the four levels of the illumination intensity of ambient light, and the six levels of the color temperature value is created, and finally the subjection of the level of the color temperature value corresponding to the subjection of the level of the current PERCLOS, and the subjection of the level of the current illumination intensity of ambient light is determined under the preset fuzzy rule, and defuzzified to determine the target color value.

Figure 2:
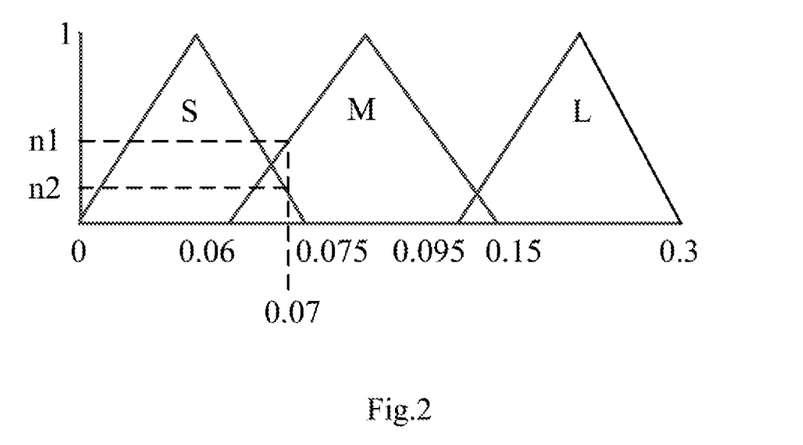
FIG. 2 is a subjection function of a percentage of eyelid closure over the pupil, over time, according to an embodiment of the disclosure.

In some embodiments of the present disclosure, of the disclosure, the PERCLOS is categorized into only three levels, but the range of the PERCLOS may be not categorized into three levels, and instead may be categorized into four or more levels. In the embodiment of the disclosure, the number of times when the eyes of the user are closed, and the lengths of time for which the eyes are closed can be obtained by a camera. Referring to FIG. 2, for example, the range of the value of the PERCLOS is 0 to 0.3, where as derived empirically, if the value of the PERCLOS lies in the range of 0 to 0.075, then it will belong to Level-headed (S); if the value of the PERCLOS lies in the range of 0.06 to 0.15, then it will belong to Fatigued (M); and if the value of the PERCLOS lies in the range of 0.095 to 0.3, then it will belong to Exhausted (L). Referring to FIG. 2, when the value of the PERCLOS lies in the range of 0.06 to 0.075, it belongs to both the levels of Level-headed (S) and Fatigued (M); and when the value of the PERCLOS lies in the range of 0.095 to 0.15, it belongs to both the levels of Fatigued (M) and Exhausted (L). In order to determine the specific level including the PERCLOS belonging to both Level-headed (S) and Fatigued (M), this can be further determined according to the subjection function as illustrated in FIG. 2. As illustrated in FIG. 2, for example, if the value of the PERCLOS is 0.07, then since the value of the subjection n1 (the value of the ordinate as illustrated in FIG. 2) of Fatigued (M) corresponding to 0.07 is greater than the value of the subjection n2 (the value of the ordinate as illustrated in FIG. 2) of Level-headed (S) corresponding to 0.07, it will be determined that the level corresponding to the PERCLOS 0.07 is Fatigued (M), and the corresponding subjection is n1. If the subjection of the value of the PERCLOS belonging to Level-headed (S) is equal to the subjection of the value of the PERCLOS belonging to Fatigued (M), then the subjection corresponding to the value of the PERCLOS may be determined empirically.

Figure 3:
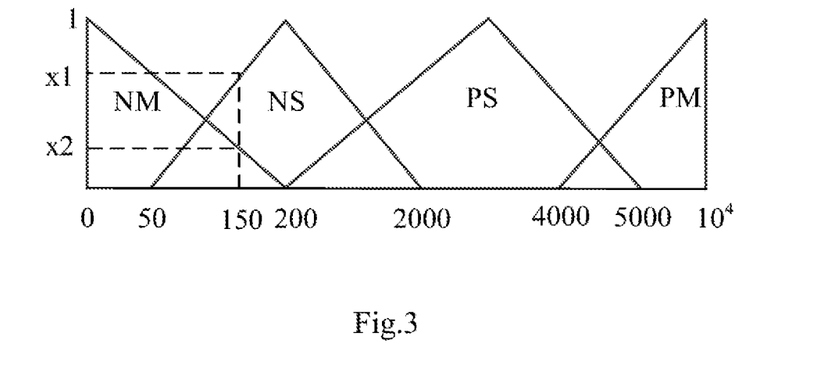
FIG. 3 is a subjection function of an illumination intensity of ambient light according to an embodiment of the disclosure.

In some embodiments of the present disclosure, of the disclosure, the illumination intensity of ambient light is categorized into four levels which are Dark light rays (NM), Normal light rays (NS), Bright light rays (PS), and Very bright light rays (PB) respectively. In the embodiment of the disclosure, the illumination intensity of ambient light can be obtained by a sensor. Referring to FIG. 3, for example, the range of the value of the illumination intensity of ambient light is 0 to $10^4$ Lux, where as derived empirically, if the value of the illumination intensity lies between 0 and 200 Lux, then the corresponding level thereof will be Dark light rays (NM); if the value of the illumination intensity lies between 50 and 2000 Lux, then the corresponding level thereof will be Normal light rays (NS); if the value of the illumination intensity lies between 200 and 5000 Lux, then the corresponding level thereof will be Bright light rays (PS); and if the value of the illumination intensity lies between 5000 and $10^4$ Lux, then the corresponding level thereof will be Very bright light rays (PB). For example, if the illumination intensity lies in the range between 50 and 2000 Lux, and 4000 and 5000 Lux, then it will corresponds to two levels of illumination intensity, and the level corresponding to the illumination intensity at a fixed value will be determined according to the value of the ordinate corresponding to each level of illumination intensity, the value of the corresponding subjection, where if the same value of illumination intensity corresponds to two values of subjection, then the level corresponding to the illumination intensity will be determined the level corresponding to the greater value of subjection. Referring to FIG. 3, for example, when the illumination intensity is 150 Lux, it lies in both the range of Dark light rays (NM), and the range of Normal light rays (NS), but the value x1 of the subjection of the illumination intensity 1.5 belonging to Normal light rays (NS) is greater than the value x2 of the subjection of the illumination intensity belonging to Dark light rays (NM), so when the illumination intensity is 150 Lux, the corresponding level is Normal light rays (NS), and the subjection of the illumination intensity belonging to Normal light rays (NS) is x1. When the illumination intensity corresponds to identical values of subjection, the level corresponding to the illumination intensity; and the subjection at this level can be further determined empirically.

Figure 4:
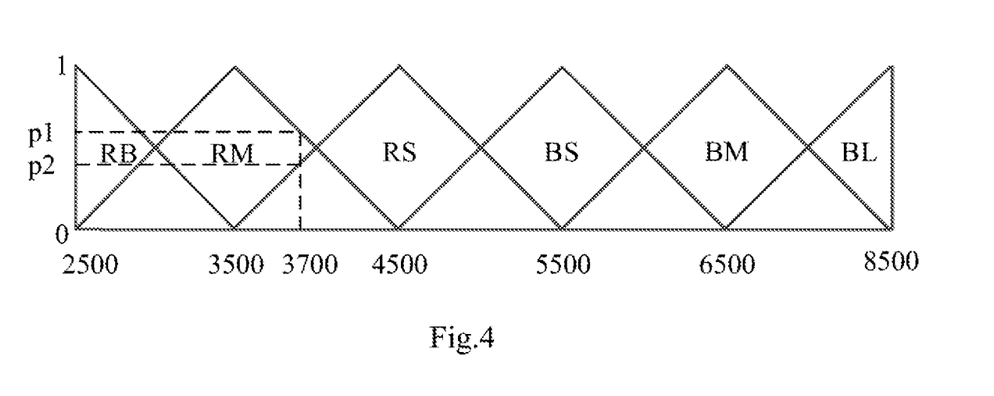
FIG. 4 is a subjection function of a color temperature value according to an embodiment of the disclosure.

In some embodiments of the present disclosure, the color temperature value of the display panel is categorized into six levels which are Warm and reddish light (RB), Normal and warm light (RM), Normal and natural white light (RS), Natural, white and bluish light (BS), Normal and cold white (BM), and Cold and bluish light (BL) respectively in the embodiment of the disclosure. The subjection function of the color temperature value in the embodiment of the disclosure is defined in the form of a trigonometric function, and of course, it can be defined otherwise; and as illustrated in FIG. 4, the subjection function is expressed in a number of forms, although the embodiment of the disclosure will not be limited thereto. Referring to FIG. 4, for example, the range of the color temperature value is 2500 to 8500, where as derived empirically, if the color temperature value lies between 2500 to 3500, then the corresponding level will be Warm and reddish light (RB); if the color temperature value lies between 2500 to 4500, then the corresponding level will be Normal and warm light (RM); if the color temperature value lies between 3500 to 5500, then the corresponding level will be Normal and natural white light (RS); if the color temperature value lies between 4500 to 6500, then the corresponding level will be Natural, white and bluish light (BS); if the color temperature value lies between 5500 to 8500, then the corresponding level will be Normal and cold white (BM); and if the color temperature value lies between 6500 to 8500, then the corresponding level will be and Cold and bluish light (BL). Apparently each color temperature value lies in the ranges of two levels, and each color temperature value corresponds to subjections at the two different levels. For example, when the color temperature value is 3500, the corresponding level is Normal and warm light (RM), the subjection thereof at the level of Normal and warm light (RM) is 1, and both of the subjections thereof at the levels of Warm and reddish light (RB), and Normal and natural white light (RS) are 0, so the color temperature value is determined as 3500, the corresponding level is Normal and warm light (RM), and the subjection thereof at the level of Normal and warm light (RM) is 1; and when the same color temperature value corresponds to two values of subjection, the level corresponding the color temperature value is determined as the level corresponding to the greater value of subjection. Referring to FIG. 4, for example, when the color temperature value is 3700, it lies in both the range of Normal and warm light. (RM), and the range of Normal and natural white light (RS), but the value p1 of the subjection thereof at the level of Normal and warm light (RM) is greater than the value p2 of the subjection thereof at the level of Normal and natural white light (RS), so when the color temperature value is 3700, the corresponding level is Normal and warm light (RM), and the subjection thereof at the level Normal and warm light (RM) is p1. When the color temperature value corresponds to identical values of subjection, the level corresponding to the color temperature value, and the subjection at this level can be further determined empirically.

Accordingly all the three subjection functions in the embodiment of the disclosure are expressed in the form of a trigonometric function, and they can be expressed otherwise, although the embodiment of the disclosure will not be limited thereto. In the embodiment of the disclosure, the range of each level corresponding to each subjection function is derived empirically, but the subjection functions may not necessarily be those created from the data as illustrated in FIG. 2 to FIG. 4.

In some embodiments of the present disclosure, after the subjection functions are created, the fuzzy rule is created in which the three levels of the PERCLOS, and the four levels of the illumination intensity of ambient light are input signals, and the six levels of the color temperature value is an output signal, where the fuzzy rule is created in the following fuzzy language:

If (X is S&Y is NM), Then (C is RS);
If (X is S&Y is NS), Then (C is BS);
if (X is S&Y is PS), Then (C is BM);
If (X is S&Y is PB), Then (C is BL);
If (X is M&Y is NM), Then (C is RM);
If (X is M&Y is NS), Then (C is BS);
If (X is M&Y is PS), Then (C is BS);
If (X is M&Y is PB), Then (C is BM);
if (X is L&Y is NM), Then (C is RB;
If (X is L&Y is NS), Then (C is RM);
If (X is L&Y is PS). Then (C is RS);
If (X is L&Y is PB), Then (C is BS).

Where X is the level corresponding to the PERCLOS, Y is the level corresponding to the illumination intensity of ambient light, and C is the level corresponding to the color temperature value. Table 2 depicts the fuzzy rule created in the fuzzy language above.

TABLE 2

| Y | X | | |
|---|---|---|---|
|   | S | M | L |
| NM | RS | RM | RB |
| NS | BS | RS | RM |
| PS | BM | BS | RS |
| PB | BL | BM | BS |

In some embodiments of the present disclosure, the target color temperature value is determined under the preset fuzzy rule. In the embodiment of the disclosure, the target color temperature value corresponding to the current PERCLOS, and the current illumination intensity of ambient light is determined using the preset fuzzy rule, and the screen is adjusted to the target color temperature value by: fuzzifying the values of the current PERCLOS, and the current illumination intensity of ambient light; determining the subjection of the level corresponding to the fuzzified current PERCLOS according to the subjection function of the PERCLOS; determining the subjection of the level corresponding to the fuzzified current illumination intensity of ambient light according to the subjection function of the illumination intensity of ambient light; determining the subjection of the level of the color temperature value corresponding to the subjection of the level corresponding to the current PERCLOS, and the subjection of the level corresponding to the current illumination intensity of ambient light under the fuzzy rule; and de-fuzzifying the subjection of the level of the color temperature value, and determining the subjection of the level of the color temperature value.

In some embodiments of the present disclosure, the subjection of the level of the color temperature value can be defuzzified in a number of implementations, and for example, the subjection of the level of the color temperature value is defuzzified based upon a center-of-gravity method.

In some embodiments of the present disclosure, the screen is adjusted to the target color temperature value by adjusting the proportion of blue light among red, blue, and green light of the screen until the screen reaches the target color temperature value. In some embodiments of the present disclosure, in order to avoid the eyes from being hurt by the blue light of brightness on the screen, the color temperature of the screen is generally adjusted by adjusting it to the target color temperature value through adjusting the proportion of the blue light. For example, if the color temperature value of the screen is high, the PERCLOS of the user is determined, and then it is determined that the current level of the eyes of the user is Exhausted, so the color temperature value needs to be lowered to thereby alleviate the eyes from being hurt by the screen, and accordingly the color temperature value is lowered by lowering the proportion of the blue light among the red, blue, and green light of the screen to thereby adapt to the level of the eyes of the user. If the color temperature value of the screen is low, the PERCLOS of the user is determined, and it is determined that the current level of the eyes of the user is Level-headed, so the color temperature value needs to be raise to thereby alleviate the eyes from being hurt by the screen, and accordingly the color temperature value is raised by raising the proportion of the blue light among the red, blue, and green light of the screen to thereby adapt to the level of the eyes of the user.

According to the embodiment of the disclosure firstly the value of the obtained PERCLOS is fuzzified into the subjection of the corresponding PERCLOS, and the value of the obtained illumination intensity of ambient light is fuzzified into the subjection of the corresponding illumination intensity of ambient light, respectively according to the subjection function of the PERCLOS, and the subjection function of the illumination intensity of ambient light, then the subjection of the PERCLOS, and the subjection of the illumination intensity of ambient light are taken as input values, and the corresponding output value, i.e., the subjection of the corresponding color temperature value, is determined, under the fuzzy rule, and finally the subjection of the color temperature value is defuzzified according to the subjection function of the color temperature value, and the target color temperature value is determined. The color temperature value is adjusted accordingly in the fuzzy control algorithm to the color temperature value adapted to the ambient, and the fatigue extent of the eyes. This algorithm is simple, but also the color temperature value is easy to control, and precise.

The method for adjusting color temperature according to the embodiment of the disclosure will be described below in details in connection with an optional embodiment thereof.

Figure 5:
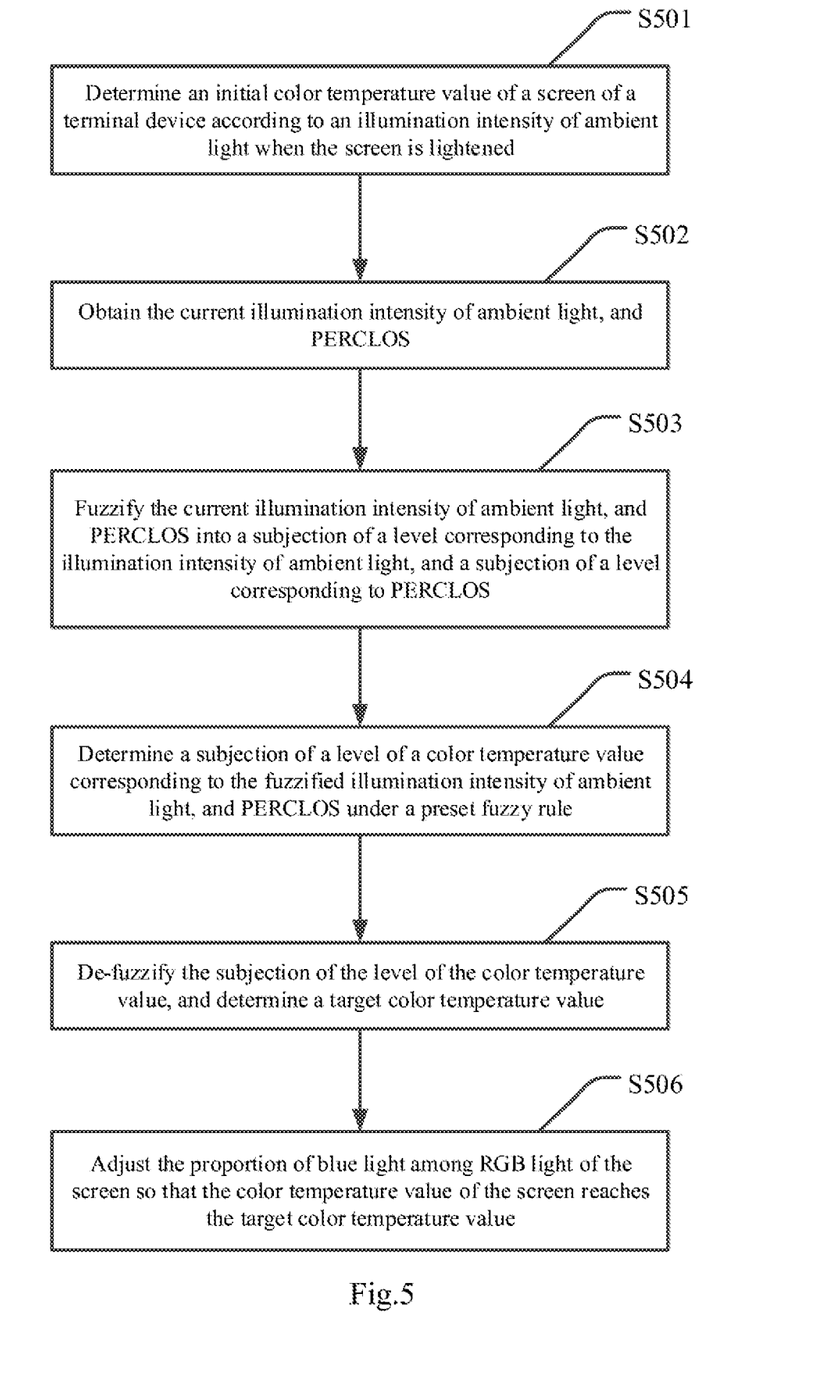
FIG. 5 is a schematic flow chart of another method for adjusting color temperature based upon fuzzy control according to an embodiment of the disclosure.

Referring to FIG. 5, a method for adjusting color temperature based upon fuzzy control according to an embodiment of the disclosure includes the following steps.

S501 is to determine an initial color temperature value of a screen of a terminal device according to an illumination intensity of ambient light when the screen is lightened.

S502 is to obtain the current illumination intensity of ambient light, and a percentage of eyelid closure over the pupil, over time (PERCLOS) periodically.

S503 is to fuzzify the current illumination intensity of ambient light, and PERCLOS to obtain a subjection of a level corresponding to the illumination intensity of ambient light, and a subjection of a level corresponding to the PERCLOS.

S504 is to determine a subjection of a level of a color temperature value corresponding to the fuzzified illumination intensity of ambient light, and PERCLOS under a preset fuzzy rule.

S505 is to de-fuzzify the subjection of the level of the color temperature value, and to determine a target color temperature value.

S506 is to adjust the proportion of blue light among RGB light of the screen so that the color temperature value of the screen reaches the target color temperature value.

Figure 6:
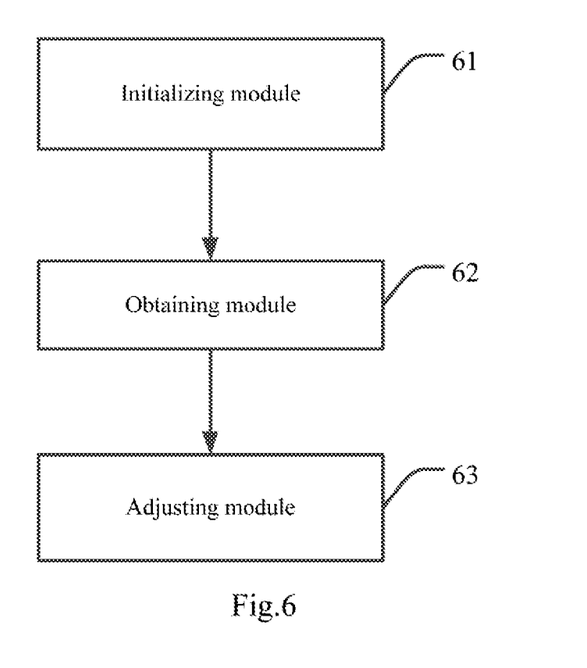
FIG. 6 is a schematic structural diagram of an apparatus for adjusting color temperature based upon fuzzy control according to an embodiment of the disclosure.

Based upon the same inventive idea, referring to FIG. 6, an apparatus for adjusting color temperature based upon fuzzy control according an embodiment of the disclosure includes followings.

An initializing module 61 is configured to determine an initial color temperature value of a screen of a terminal device according to an illumination intensity of ambient light when the screen is lightened.

An obtaining module 62 is configured to obtain a percentage of eyelid closure over the pupil, over time (PERCLOS) of a user, and the illumination intensity of ambient light at a preset periodicity.

An adjusting module 63 is configured to determine a target color temperature value corresponding to the current PERCLOS of the user, and the current illumination intensity of ambient light using a fuzzy controller, and to adjust the screen to the target color temperature value, where the fuzzy controller takes the PERCLOS, and the illumination intensity of ambient light as input signals, and the color temperature as an output signal.

In the apparatus according to some embodiments of the disclosure, the fuzzy controller includes a preset fuzzy rule. The preset fuzzy rule is created by categorizing the PERCLOS into three levels which are Level-headed (S), Fatigued (M) and Exhausted (L) respectively, and to create a subjection function of the PERCLOS; to categorize the illumination intensity of ambient light into four levels which are Dark light rays (NM), Normal light rays (NS), Bright light rays (PS), and Very bright light rays (PB) respectively; and to create a subjection function of the illumination intensity of ambient light; and to categorize the color temperature value into six levels which are Warm and reddish light (RB), Normal and warm light (RM), Normal and natural white light (RS), Natural, white and bluish light (BS), Normal and cold white (BM), and Cold and bluish light (BL) respectively, and to create a subjection function of the color temperature value; and to take the three levels corresponding to the PERCLOS, and the four levels corresponding to the illumination intensity of ambient light as input signals, to take the six levels of the color temperature value as an output signal.

In the apparatus according to some embodiment of the disclosure, the adjusting module 63 is configured to fuzzify the values of the current PERCLOS, and the current illumination intensity of ambient light, to determine the subjection of the level corresponding to the fuzzified current PERCLOS according to the subjection function of the PERCLOS, and to determine the subjection of the level corresponding to the fuzzified current illumination intensity of ambient light according to the subjection function of the illumination intensity of ambient light; to determine the subjection of the level of the color temperature value corresponding to the subjection of the level corresponding to the current PERCLOS, and the subjection of the level corresponding to the current illumination intensity of ambient light under the fuzzy rule; and to de-fuzzify the subjection of the level of the color temperature value, and to determine the subjection of the level of the color temperature value.

In the apparatus according to some embodiments of the disclosure, the obtaining module 62 is configured to obtain the PERCLOS X of the user in a preset length of time in the equation of:

$$X = \sum_{i=1}^{n} \frac{t}{T}\ 1 \le i \le n;$$

where T is the length of time of the periodicity, t is each instance of time when the eyes are closed, and n is the number of times that the eyes are closed in the length of time of the periodicity.

In the apparatus according to some embodiments of the disclosure, the adjusting module 63 configured to adjust the screen to the target color temperature value is configured to adjust the proportion of blue light among red, blue, and green light of the screen until the screen reaches the target color temperature value.

Based upon the same inventive idea, an apparatus for adjusting color temperature based upon fuzzy control according an embodiment of the disclosure includes a processor and a memory configured to store computer-readable programs.

The processor is configured to read the computer-readable programs to determine an initial color temperature value of a screen of a terminal device according to an illumination intensity of ambient light when the screen is lightened; to obtain a percentage of eyelid closure over the pupil, over time (PERCLOS) of a user, and the illumination intensity of ambient light at a preset periodicity; and to determine a target color temperature value corresponding to the current PERCLOS of the user, and the current illumination intensity of ambient light using a fuzzy controller, and to adjust the screen to the target color temperature value, where the fuzzy controller takes the PERCLOS, and the illumination intensity of ambient light as input signals, and the color temperature as an output signal.

In some embodiments of the present disclosure, the processor is further configured to read the computer-readable programs to implement the method for adjusting color temperature based upon fuzzy control according to any embodiments above.

In summary, in the method and apparatus for adjusting color temperature based upon fuzzy control according to the embodiments of the disclosure, firstly the initial color temperature value of the screen of the terminal device is determined according to the illumination intensity of ambient light when the screen is lightened; then the PERCLOS of the user, and the illumination intensity of ambient light are obtained at the preset periodicity; and the target color temperature value corresponding to the current PERCLOS, and the current illumination intensity of ambient light is determined using the fuzzy controller, and the screen is adjusted to the target color temperature value, where the fuzzy controller takes the PERCLOS, and the illumination intensity of ambient light as input signals, and the color temperature as an output signal. Accordingly in the method and apparatus for adjusting color temperature based upon fuzzy control according to the embodiments of the disclosure, the initial color temperature value is determined according to the illumination intensity of ambient light when the screen is lightened, and then the screen is adjusted in real time to the corresponding target color temperature value according to the PERCLOS, and the illumination intensity of ambient light, both of which are obtained periodically. Apparently in the embodiments of the disclosure, the color temperature of the screen is adjusted in real time according to the illumination intensity of ambient light, and the PERCLOS of the user to thereby alleviate the eyes from being fatigued, so as to further alleviate the eyes from being hurt.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method for adjusting color temperature based upon fuzzy control, the method comprising:
   determining an initial color temperature value of a screen of a terminal device according to an illumination intensity of ambient light in response to that the screen is lightened;
   obtaining a percentage of eyelid closure over the pupil (PERCLOS), over time, of a user, and the illumination intensity of ambient light at a preset periodicity; and
   determining a target color temperature value corresponding to the PERCLOS of the user, and the illumination intensity of ambient light according to a preset fuzzy rule, and adjusting the screen to the target color temperature value;
   the preset fuzzy rule is created by:
   categorizing the PERCLOS into three levels which are Level-headed (S), Fatigued (M), and Exhausted (L) respectively; categorizing the illumination intensity of ambient light into four levels which are Dark light rays (NM), Normal light rays (NS), Bright light rays (PS), and Very bright light rays (PB) respectively; and categorizing the color temperature value into six levels which are Warm and reddish light (RB), Normal and warm light (RM), Normal and natural white light (RS), Natural, white and bluish light (BS), Normal and cold white (BM), and Cold and bluish light (BL) respectively and creating a subjection function of the color temperature value; and
   taking the at least one level corresponding to the PERCLOS, and the at least one level corresponding to the illumination intensity of ambient light as input signals, taking the at least one level of the color temperature value as an output signal, so as to generate the preset fuzzy rule as follows;
   If X is S and Y is NM, C is RS;
   If X is S and Y is NS, C is BS;
   If X is S and Y is PS, C is BM;
   If X is S and Y is PB, C is BL;
   If X is M and Y is NM, C is RM;
   If X is M and Y is NS, C is BS;
   If X is M and Y is PS, C is BS;
   If X is M and Y is PB, C is BM;
   If X is L and Y is NM, C is RB;
   If X is L and Y is NS, C is RM;
   If X is L and Y is PS, C is RS;
   If X is L and Y is PB, C is BS;
   wherein X is the level corresponding to the PERCLOS, Y is the level corresponding to the illumination intensity of ambient light, and C is the level corresponding to the color temperature value;
   wherein the determining a target color temperature value corresponding to the PERCLOS of the user, and the illumination intensity of ambient light according to a preset fuzzy rule, and adjusting the screen to the target color temperature value, comprises:
   fuzzifying the values of the PERCLOS, and the illumination intensity of ambient light, determining the subjection of the level corresponding to fuzzified PERCLOS according to the subjection function of the PERCLOS, and determining the subjection of the level corresponding to fuzzified illumination intensity of ambient light according to the subjection function of the illumination intensity of ambient light;
   determining the subjection of the level of the color temperature value corresponding to the subjection of the level corresponding to the current PERCLOS, and the subjection of the level corresponding to the current illumination intensity of ambient light under the fuzzy rule; and
   de-fuzzifying the subjection of the level of the color temperature value, and determining the subjection of the level of the color temperature value.

2. The method according to claim 1, wherein the de-fuzzifying the subjection of the level of the color temperature value comprises:
   de-fuzzifying the subjection of the level of the color temperature value based upon a center-of-gravity method.

3. The method according to claim 1, wherein the PERCLOS of the user in a preset length of time is obtained in the equation of:

$$X = \sum_{i=1}^{n} \frac{t_i}{T} \ 1 \le i \le n;$$

wherein X is the PERCLOS of the user in a preset length of time, T is the length of time of the periodicity, $t_i$ is an instance of time when the eyes are closed, and n is a number of times that the eyes are closed in the length of time of the periodicity.

4. The method according to claim 1, wherein the adjusting the screen to the target color temperature value comprises:
adjusting a proportion of blue light among red, blue, and green light of the screen until the screen reaches the target color temperature value.

5. An apparatus for adjusting color temperature based upon fuzzy control, the apparatus comprising a processor and a memory configured to store computer-readable programs; wherein the processor is configured to read the computer-readable programs to:
determine an initial color temperature value of a screen of an terminal device according to an illumination intensity of ambient light in response to that the screen is lightened;
obtain a percentage of eyelid closure over the pupil (PERCLOS), over time, of a user, and the illumination intensity of ambient light at a preset periodicity; and
determine a target color temperature value corresponding to the PERCLOS of the user, and the illumination intensity of ambient light using a fuzzy controller, and to adjust the screen to the target color temperature value;
wherein the fuzzy controller is configured to enforce a preset fuzzy rule and the preset fuzzy rule is created by:
categorizing the PERCLOS into three levels which are Level-headed (S), Fatigued (M), and Exhausted (L) respectively; categorizing the illumination intensity of ambient light into four levels which are Dark light rays (NM), Normal light rays (NS), Bright light rays (PS), and Very bright light rays (PB) respectively; and categorizing the color temperature value into six levels which are Warm and reddish light (RB), Normal and warm light (RM), Normal and natural white light (RS), Natural, white and bluish light (BS), Normal and cold white (BM), and Cold and bluish light (BL) respectively and creating a subjection function of the color temperature value; and
taking the at least one level corresponding to the PERCLOS, and the at least one level corresponding to the illumination intensity of ambient light as input signals, taking the at least one level of the color temperature value as an output signal, so as to generate the preset fuzzy rule as follows;
If X is S and Y is NM, C is RS;
If X is S and Y is NS, C is BS;
If X is S and Y is PS, C is BM;
If X is S and Y is PB, C is BL;
If X is M and Y is NM, C is RM;
If X is M and Y is NS, C is BS;
If X is M and Y is PS, C is BS;
If X is M and Y is PB, C is BM;
If X is L and Y is NM, C is RB;
If X is L and Y is NS, C is RM;
If X is L and Y is PS, C is RS;
If X is L and Y is PB, C is BS;
wherein X is the level corresponding to the PERCLOS, Y is the level corresponding to the illumination intensity of ambient light, and C is the level corresponding to the color temperature value;
wherein the processor is configured to read the computer-readable programs to determine a target color temperature value corresponding to the PERCLOS of the user, and the illumination intensity of ambient light according to a preset fuzzy rule, and adjust the screen to the target color temperature value, by:
fuzzifying the values of the PERCLOS, and the illumination intensity of ambient light, determining the subjection of the level corresponding to fuzzified PERCLOS according to the subjection function of the PERCLOS, and determining the subjection of the level corresponding to fuzzified illumination intensity of ambient light according to the subjection function of the illumination intensity of ambient light;
determining the subjection of the level of the color temperature value corresponding to the subjection of the level corresponding to the current PERCLOS, and the subjection of the level corresponding to the current illumination intensity of ambient light under the fuzzy rule; and
de-fuzzifying the subjection of the level of the color temperature value, and determining the subjection of the level of the color temperature value.

6. The apparatus according to claim 5, wherein the processor is configured to read the computer-readable programs to obtain the PERCLOS of the user in a preset length of time in the equation of:

$$X = \sum_{i=1}^{n} \frac{t_i}{T} \ 1 \le i \le n;$$

wherein X is the PERCLOS of the user in a preset length of time, T is the length of time of the periodicity, $t_i$ is each instance of time when the eyes are closed, and n is the number of times that the eyes are closed in the length of time of the periodicity.

7. The apparatus according to claim 5, wherein the processor is configured to read the computer-readable programs to adjust the screen to the target color temperature value by:
adjusting a proportion of blue light among red, blue, and green light of the screen until the screen reaches the target color temperature value.

* * * * *